(12) United States Patent
Zhang et al.

(10) Patent No.: US 9,350,163 B2
(45) Date of Patent: May 24, 2016

(54) INTER-AREA OSCILLATION DETECTION

(75) Inventors: Zhiying Zhang, Ontario (CA); Ilia Voloh, Ontario (CA); Jorge Eduardo Cardenas Medina, Guadalajara (ES)

(73) Assignee: General Electric Company, Schenectady, NY (US)

( * ) Notice: Subject to any disclaimer, the term of this patent is extended or adjusted under 35 U.S.C. 154(b) by 562 days.

(21) Appl. No.: 13/277,071

(22) Filed: Oct. 19, 2011

(65) Prior Publication Data
US 2013/0100564 A1 Apr. 25, 2013

(51) Int. Cl.
*G01R 15/00* (2006.01)
*G01R 21/00* (2006.01)
*H02H 7/28* (2006.01)
*H02H 3/04* (2006.01)

(52) U.S. Cl.
CPC .............. *H02H 7/28* (2013.01); *H02H 3/046* (2013.01); *H02H 3/048* (2013.01)

(58) Field of Classification Search
CPC ........... G01D 1/14; G01D 3/08; G01D 5/145; G01R 19/2513; H02H 7/28; H02H 3/00; H02H 3/048; H02H 3/046; H02P 23/14
USPC ..................................................... 702/57, 60
See application file for complete search history.

(56) References Cited

U.S. PATENT DOCUMENTS

| | | | | |
|---|---|---|---|---|
| 4,788,653 | A * | 11/1988 | Henderson et al. | 708/300 |
| 4,855,861 | A * | 8/1989 | Bergman et al. | 361/65 |
| 6,476,521 | B1 * | 11/2002 | Lof et al. | 307/105 |
| 6,662,124 | B2 * | 12/2003 | Schweitzer et al. | 702/65 |
| 7,149,637 | B2 | 12/2006 | Korba et al. | |
| 8,494,795 | B2 * | 7/2013 | Zweigle et al. | 702/66 |
| 2005/0187726 | A1 | 8/2005 | Korba et al. | |
| 2005/0231871 | A1 * | 10/2005 | Karimi Ghartemani | 361/86 |
| 2009/0088990 | A1 * | 4/2009 | Schweitzer et al. | 702/58 |
| 2009/0099798 | A1 | 4/2009 | Gong et al. | |
| 2013/0096854 | A1 * | 4/2013 | Schweitzer et al. | 702/59 |
| 2014/0361537 | A1 * | 12/2014 | Andresen et al. | 290/44 |

OTHER PUBLICATIONS

O. Faucon' and Laurent Dousser, Coordinated Defense Plan Protects Against Transient Instabilities, IEEE, 1997, 22-26.*
B. B Kasztenny, w. Premerlanit, M. Adamiak, Synchrophasor Algorithm Allowing Seamless Integration with Today's Relays, General Electric Company, Mar. 17-20, 2008, 724-729.*
A. R. Messina, Vijay Vittal, Nonlinear, Non-Stationary Analysis of Interarea Oscillations via Hilbert Spectral Analysis, IEEE Transactions on Power Systems, vol. 21, No. 3, August 2006, 1234-1241.*
Casper Labuschagne and Nonnann Fischer, Transformer Fault Analysis Using Event Osci Ilography, Schweitzer Engineering Laboratories, Inc., IEEE, 2007, 467-482.*
Zhang et al., "Inter-Area Oscillation Detection by Modern Digital Relay," 37th Western Protective Relay Conference, Oct. 19-21, 2010, pp. 1-22, Spokane, WA.

* cited by examiner

*Primary Examiner* — Gregory J Toatley
*Assistant Examiner* — Eman Alkafawi
(74) *Attorney, Agent, or Firm* — Parks IP Law LLC; Cynthia R. Parks

(57) ABSTRACT

A device includes interface circuitry. The interface circuitry receives first input signals related to measurements of characteristics of electricity passing through a first power line. The device includes filtering circuitry that filters the first input signals to generate filtered data. The device also includes a processor that estimates an oscillation frequency of the filtered data via a time-domain frequency estimation method.

19 Claims, 2 Drawing Sheets

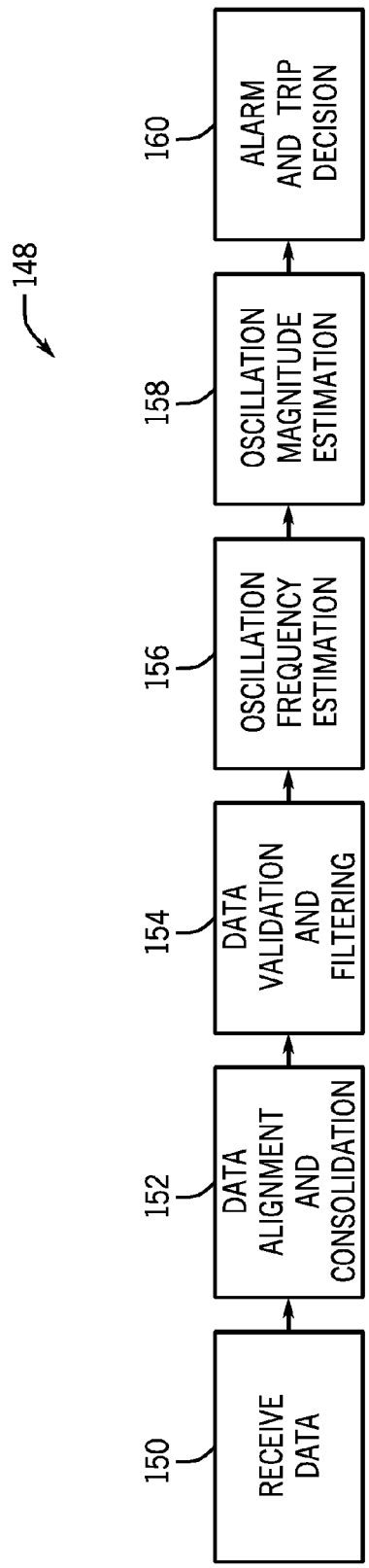

INTER-AREA OSCILLATION DETECTION

BACKGROUND OF THE INVENTION

The subject matter disclosed herein relates to detection of inter-area low frequency oscillations in power lines.

Modern power systems are becoming increasingly interconnected to each other for the benefits of increased reliability, reduced operation cost, improved power quality, and reduced necessary spinning reserve. However, the interconnected power systems may also bring some technical challenges. Of them, inter-area low frequency oscillations have become one of the major threats to reliable operations of large-scale power systems. Inter-area oscillations may occur when large synchronously interconnected power systems have rotor angle/frequency/power/voltage/current swings between the synchronous generators of a first subsystem (or of large power plant) and another subsystem (or other subsystems).

Inter-area oscillations not only limit the amount of power transfer, but also threaten the system security, because they may lead to system instability, which may result in cascading outages in the system. Therefore, it is desirable to identify the characteristics of the inter-area oscillations, including oscillation frequency and damping ratio, so that proper actions can be taken based on the identification results to improve system damping and maintain system stability.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a master relay configured to sample input signals related to measurements of characteristics of electricity passing through a power line, estimate an oscillation frequency of the sample input signals via a time-domain frequency estimation method, and estimate an oscillation magnitude of the sample input signals via an adjusted window Fourier transform calculation based on the estimated oscillation frequency.

In a second embodiment, a non-transitory computer readable medium includes computer-readable instructions to receive input signals related to measurements of characteristics of electricity passing through a power line, validate the input signals, and estimate an oscillation frequency of the input signals via a time-domain frequency estimation method.

In a third embodiment, a device, includes interface circuitry configured to receive first input signals related to measurements of characteristics of electricity passing through a first power line, filtering circuitry configured to filter the first input signals to generate filtered data, and a processor configured to estimate an oscillation frequency of the filtered data via a time-domain frequency estimation method.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is flow diagram illustrating steps undertaken by the master relay of FIG. 2 to determine inter-area low frequency oscillations in power lines of the power transmission system of FIG. 1.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to an inter-area oscillation detection system that may incorporate a small signal oscillation detector (SSOD). This SSOD may be implemented, for example, in one or more relays positioned in a power transmission system. The relays, utilizing the SSOD, may estimate an oscillation frequency and an oscillation magnitude on a given power line. Any SSOD may operate to provide alert to system operators or to cause a separation in the interconnected system (e.g., trip or interrupt the system) when a persistent or an unstable oscillation occurs. Additionally, the SSOD may utilize real time measured analog quantities, for example frequency or real power on the power lines between different power systems to make determination if an alarm or trip signal should be issued. Furthermore, the measured data may come from a local relay alone, or from one or more remote relays.

Figure 1:
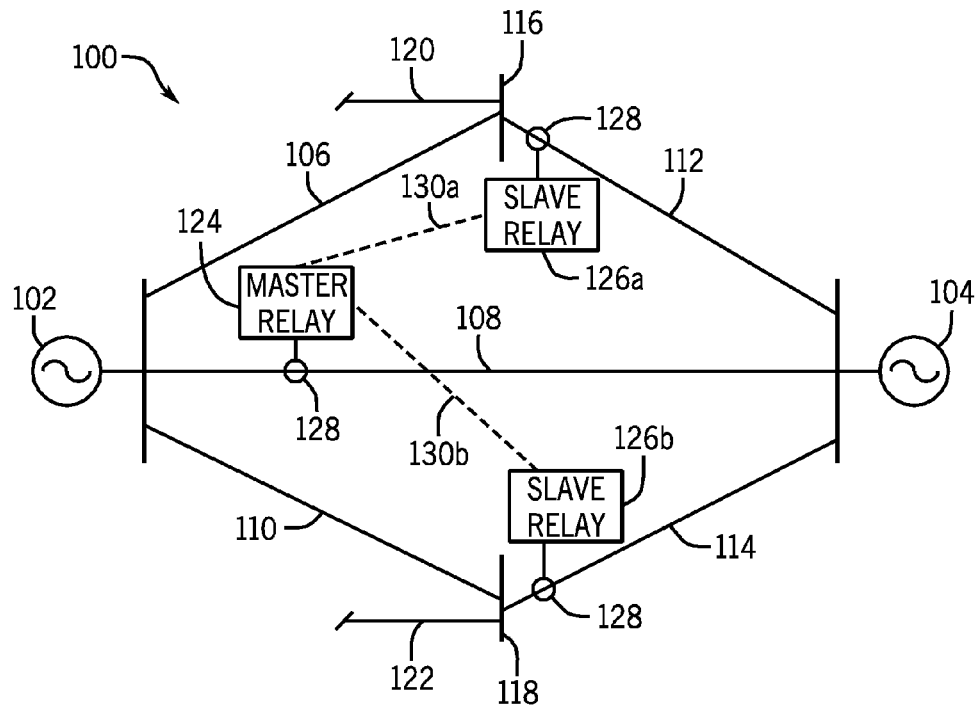
FIG. 1 is a block diagram of a power transmission system, in accordance with an embodiment.

With the foregoing in mind, FIG. 1 represents a power transmission system 100. The system 100 may include a first power generation system 102 and a second power generation system 104. Each of the power generation systems 102 and 104 may represent one or more power plants powered by, for example, nuclear fission, burning of fossil fuels (such as coal or natural gas), wind, solar energy, or the like. It should be noted that the power generation systems 102 and 104 may be separated by, for example, 50 miles, 100 miles, 200 miles, or more. In another embodiment, each of the power generation systems 102 and 104 may reside in differing regions such as different states, provinces, countries, or the like. Accordingly, power generation system 102 may generate electricity that includes differing characteristics (voltage, current, etc.) than the electricity generated at power generation system 104, based on, for example, the requirements and/or regulations of a particular region in which the power generation systems 102 and 104 are located.

Power generation systems 102 and 104 may each generate electricity to be transmitted across power lines 106, 108, 110, 112, and 114 (e.g., high voltage power lines). These power lines 106, 108, 110, 112, and 114 may transmit electricity at voltages, for example, of 110 kV or greater to substations 116 and 118, which, for example, may include step-down transformers, to reduce the voltage of the electricity received. This stepped-down voltage may then be distributed to customers, for example, along distribution lines 120 and 122.

Additionally, the power transmission system 100 may include relays, such as master relay 124 and slave relays 126a and 126b. Each of the master relay 124 and the slave relays 126a and 126b may operate to monitor a particular power line, power line 108, 112, and 114, respectively, to detect inter-area low frequency oscillations caused by, for example, power generation systems 102 and 104 transmitting power in a non-synchronous manner. This monitoring may occur via interface circuitry 128 that may be coupled (externally or internally) to each of the master relay 124 and the slave relays 126a and 126b. That is, the interface circuitry 128 may detect disturbances in the electricity passing through the power lines, for example, power lines 108, 112, and 114, that may then be utilized by the master relay 124 and the slave relays 126a and 126b to detect inter-area low frequency oscillations.

In one embodiment, a single master relay 124 may receive measurements relating to inter-area low frequency oscillations from a single one of the slave relays 126a and 126b. In another embodiment the master relay 124 may receive measurements relating to inter-area low frequency oscillations from more than one of the slave relays 126a and 126b, for example, two, three, four, five, or more slave relays. Additionally or alternatively, each of the master relay 124 and the slave relays 126a and 126b may independently determine if inter-area low frequency oscillations are occurring on its monitored power line (e.g., power lines 108, 112, and 114, respectively) independently from any other relays.

When measurements from other relays are utilized, for example, when master relay 124 receives information relating to inter-area low frequency oscillations on line 112 from slave relay 126a or information relating to inter-area low frequency oscillations on line 114 from slave relay 126b, this information may be received along communication channels 130a and 130b. In one embodiment, communication channels 130a and 130b may be an International Electrotechnical Commission's (IEC) 61850 standard communication link. Additionally or alternatively, the communication channels 130a and 130b may utilize a known wired communication channel, such as an Ethernet connection, or may utilize a known wireless communication channel, such as a wide area network or a local area network, to transmit information between, for example, slave relay 126a and master relay 124.

Figure 2:
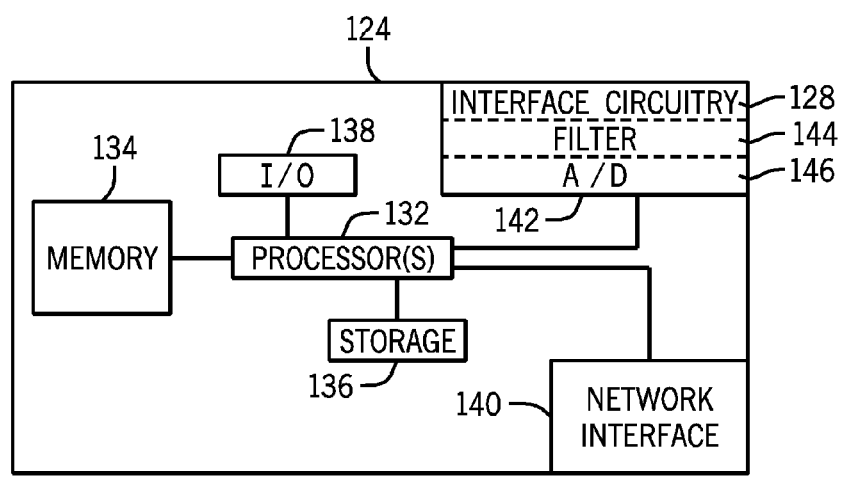
FIG. 2 is a is a block diagram of a master relay of the power transmission system of FIG. 1, in accordance with an embodiment.

FIG. 2 illustrates an embodiment of the master relay 124. In one embodiment, each of the slave relays 126a and 126b may include substantially all of the same components as will be discussed below with respect to master relay 124. Master relay 124 may include one or more processors 132 and/or other data processing circuitry that may be operably coupled to a memory 134 and storage 136 to execute instructions for carrying out the presently disclosed techniques. These instructions may be encoded in programs that may be executed by the one or more processors 132. The instructions may be stored in any suitable article of manufacturer that includes at least one tangible non-transitory, computer-readable medium that at least collectively stores these instructions or routines, such as the memory 134 or the storage 136.

The processor(s) 132 may provide the processing capability to execute an operating system, programs, and/or any other functions of the master relay 124. In one embodiment, the processor(s) 132 may operate to run a small signal oscillation detector (SSOD). The SSOD may be an algorithm, stored on a tangible machine readable medium such as memory 134 and or storage 136, that may include steps or functions performed by the processor(s) 132. These steps or functions may allow for estimation of an oscillation frequency and an oscillation magnitude on one or more given power lines (e.g., power line 108) to aid in preventing inter-area low frequency oscillations.

The processor(s) 132 may include one or more microprocessors, such as one or more "general-purpose" microprocessors, one or more special-purpose microprocessors and/or ASICS, or some combination thereof. Furthermore, as noted above, instructions or data to be processed by the processor(s) 132 may be stored in a computer-readable medium, such as a memory 134. Memory 134 may include volatile memory, such as random access memory (RAM), and/or as a non-volatile memory, such as read-only memory (ROM). Memory 134 may, for example, store firmware for the master relay 124 (such as a basic input/output instructions or operating system instructions), as well as various programs, applications, or routines executable by the processor(s) 132 in the master relay 124 (e.g., the SSOD).

As previously noted, master relay 124 may also include computer-readable media, such as storage 136. Storage 136 may include non-volatile storage for persistent storage of data and/or instructions. In one embodiment, the storage 136 may include flash memory, a hard drive, solid-state storage media, or any other known non-volatile media. The master relay 124 may also include input/output (I/O) ports 138 for connection to external devices (e.g., a portable computer, etc.) so that on site diagnostics and/or repairs of the master relay 124 may be accomplished.

Furthermore, the master relay 124 may include a network interface 140. The network interface 140 may provide communication via a wireless network, such as a local area network (LAN) (e.g., Wi-Fi), a wide area network (WAN) (e.g., 3G or 4G), or a physical connection, such as an Ethernet connection, an IEC 61850 standard communication link, and/or the like. In one embodiment, the network interface 140 may receive signals from one or more of the slave relays 126a and 126b relating to measurements for determination of inter-area low frequency oscillations on the power lines (e.g., power lines 112 and 114) that the slave relays 126a and 126b monitor.

Additionally the master relay 124 may include conversion circuitry 142. This conversion circuitry 142 may be utilized to receive measurements relating to oscillations in the power passing through a power line, for example, power line 108. Accordingly, conversion circuitry 142 may include the interface circuitry 128 from FIG. 1 or the interface circuitry 128 may be coupled thereto. Additionally, the conversion circuitry 142 may include one or more filtering circuits 144 and an analog to digital (A/D) converter circuit 146. The one or more filtering circuits 144 may filter signals received from the interface circuitry 128, for example, to operate as an anti-aliasing filter, a band pass filter, or the like. The A/D converter circuit 146 may operate on the filtered signals, for example, to produce digital signals that may be utilized by the processor(s) 132 in conjunction with the SSOD program to allow for estimation of an oscillation frequency and/or an oscillation magnitude on one or more given power lines. FIG.

3 illustrates steps that are undertaken to estimate inter-area low frequency oscillations utilizing, for example, the SSOD program as executed in the master relay 124 of FIG. 2.

FIG. 3 is a flow diagram 148 illustrating the steps undertaken to detect and alert of the presence of inter-area low frequency oscillations in real time. In step 150, data may be received, for example, at the master relay 124 from the slave relays 126a and 126b. As previously noted, this data may be received through the network interface 140 of the master relay 124 from communication channels 130a and 130b. Additionally or alternatively, the data may be received in step 150 from the interface circuitry 128 of the master relay 124.

In step 152, the data received in step 150 may be aligned and consolidated. Step 152 may include, for example, alignment and configuration of real power data and/or frequency data that are to be used as input signals (data values) to the SSOD program. However, other signals may be used, such as voltage, current, reactive power, angle differences, etc. In one embodiment, utilization of frequency signals may allow for measurement to be undertaken locally (e.g., at the master relay 124) without requiring data from the slave relays 126a and 126b. This may lead to computational efficiencies, as less overall data is utilized by the SSOD. In contrast, for example, when real power data is utilized as the input signal to the SSOD, data from the slave relays 126a and 126b (as well as any other slaves present in the system 100) may be utilized in conjunction with data from the master relay.

Regardless of the signals chosen for use as inputs to the SSOD program, data may be captured at a fixed sample rate, for example, every 10 ms, 20 ms, 50 ms, 100 ms, or at another rate. Data synchronization may be performed on the sampled data via, for example, the processor(s) 132 using linear interpolation based on a timestamp, with the synchronized data being subsequently stored in an alignment buffer, for example, in memory 134. Moreover, data that is received outside of a particular timeslot, for example, past ⅓ of the interval selected (e.g., 33 ms for a 100 ms interval) is discarded as invalid as part of the synchronization process.

In one embodiment, if two consecutive measurements are invalid (e.g., if the data is received outside of a particular timeslot), then data stored to that point is reset and the SSOD element is blocked until a set of consecutive valid measurements (e.g. data) are received (e.g., valid data received for 5 seconds, 10 seconds, 20 seconds, etc.). In this manner, the data is aligned (via the time it is received) and consolidated (by grouping any received data from a given time into a particular set) during step 152. Furthermore, it should be noted that the alignment and consolidation step 152 may be performed by the SSOD program being run on the processor(s) 132.

Once the data has been aligned and consolidated in step 152, the data may be filtered and validated in step 154. For example, filtering may be accomplished by the filtering circuits 144. This filtering in step 154 may include removing a direct current (DC) component from the data signals (as the subsequent oscillation detection and validation checks may be based on alternating current (AC) components of the signals). The filtering in step 154 may also include passing the data through a low pass filter in the filtering circuits 144 to eliminate high frequency noise elements in the data.

The filtered data may also be validated in step 154. For example, as the in-band frequency (e.g., the possible inter-area oscillation frequency range) may be 0.1 Hz to 1.0 Hz, it may be helpful to confirm (i.e., validate) that the data signals fall within this range of in-band frequencies. To validate that the data signals are in the correct frequency band, a time domain validation check may be utilized that determines whether the low pass filtered data signals lie within the correct in-band frequencies. Additional validations such as dead band checking, to determine whether consecutive positive AC samples exceed an upper dead band threshold and consecutive negative AC samples exceed a lower dead band threshold may be performed. The dead band thresholds may include tolerance levels for the steady state operation of the sample signals (e.g., whether the samples are within a preset tolerance). This dead band checking may prevent the SSOD algorithm from proceeding when low magnitude noises (oscillations in the sample data) are present.

Further validation may be undertaken in step 154. For example, a past period validation may be undertaken by the SSOD program in step 154. This past period validation may include determining whether samples for a previous period have been oscillatory in nature, e.g., that the input signal in the past period has included positive samples followed by consecutive negative samples followed by consecutive positive samples. Also verified is that the number of consecutive positive samples and the number of consecutive negative samples are within the expected limit. If each of these validations are confirmed by the SSOD, step 156 is undertaken.

In step 156, a frequency estimation for a inter-area low frequency oscillation is undertaken. For example, a time-domain frequency estimation method may be applied to estimate the raw frequency of the oscillation to be determined This may be estimated by using the following equation:

$$f(n)=1/(2\pi kTs)*\arccos\{0.5*[u(n-2k)*u(n-k)-u(n)*u(n-3k)]/[u(n-k)*u(n-k)-u(n)*u(n-2k)]\}$$

Additionally, the average frequency of the oscillation may be calculated by the following equation:

$$favg(n)=(1/N)*(f(n)+f(n-1)+\ldots+f(n-N+1))$$

Furthermore, the total number of samples for a full oscillation period may be calculated by the equation:

$$Nm=integer(fs/favg(n))$$

In the above referenced equations, u is the input signal after the process of alignment, consolidation, filtering and validation, f is the estimated raw frequency of the oscillation, favg is the N point average of f, n is the sample index, Ts is the sampling interval, N is the total number of samples in one oscillation period, and k is a number of sample delays. Moreover, both N and k may vary in run time such that, for example, in each loop of running the SSOD program, if N<Nm, the N is increased by 1 whereas if N>Nm, N is decreased by 1, and k is set to the maximum value between N/12 and 3. Through the use of these equations, the oscillation magnitude may be estimated in step 158.

That is, once the oscillation frequency is estimated, N (i.e. the total number of samples in one oscillation period) is known accordingly. Thus, the oscillation magnitude may then be calculated in step 158 by using an adaptive window length full cycle Fourier transform, i.e. a Fourier transform window length will follow the change of number N. Thus, the window length (e.g., amount of data to be operated on) in the Fourier transform may be adjusted based on the estimated oscillation frequency that has been determined. Accordingly, the full cycle N points Fourier transform calculation is defined below:

$$Cp=\cos(2\pi p/N)$$

$$Sp=-\sin(2\pi p/N)$$

$$UC(n)=(2/N)*\text{SUM}(u(n-p+N+1)*Cp)$$

$$US(n)=(2/N)*\text{SUM}(u(n-p+N+1)*Sp)$$

$$U\text{mag}(n)=\text{sqrt}(UC(n)^2+US(n)^2)$$

In the above referenced equations, p=0, 1, 2, ..., N−1, SUM is the summation of each term inside the bracket of the SUM, and Umag is the estimated oscillation magnitude. Through the use of these equations, the estimated oscillation magnitude may be realized by the SSOD program. Moreover, based on the estimated oscillation magnitude determined in step 158, an alarm and/or trip decision may be made by the SSOD program in step 160.

In step 160, the SSOD program may determine if the estimated oscillation magnitude determined in step 158, for example, exceeds a predetermined alarm threshold value. If the predetermined alarm threshold is exceeded, the SSOD program may trigger an alarm signal to be sent in step 160, for example, to one or both of the power generation systems 102 and 104. In one embodiment, this alarm may be transmitted via the network interface 140 of the master relay 124. This alarm may indicate that inter-area low frequency oscillations have been detected and may signal the power generation systems 102 and 104 that problems due to inter-area low frequency oscillations are impending.

Additionally or alternatively, in step 160, the SSOD program may determine if the estimated oscillation magnitude determined in step 158, for example, exceeds a predetermined trip threshold value. This trip threshold value may be the same value as or may differ from the value of the predetermined alarm threshold. If the predetermined trip threshold is exceeded, the SSOD program may trigger a trip signal to be sent in step 160, for example, to one or both of the power generation systems 102 and 104. In one embodiment, this trip signal may be transmitted via the network interface 140 of the master relay 124. This trip signal may indicate that inter-area low frequency oscillations have been detected and may signal the power generation systems 102 and 104 that problems are impending and that at least one of the power lines (e.g., power line 108) should be tripped (e.g., reset). In another embodiment, the master relay 124 may itself trip the power line (e.g., power line 108) via, for example, the interface circuitry 128.

This written description uses examples to disclose the invention, including the best mode, and also to allow any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for detecting inter-area oscillations between power systems, the system comprising a memory and a processor, the memory storing instructions that configure the processor to:
   receive data related to measurements of characteristics of electricity passing through one or more power lines;
   filter the received data;
   validate the filtered data by performing a time domain validation check and a dead band frequency check, the time domain validation check including determining whether the filtered data lie in a predetermined frequency band, and the dead band frequency check including determining whether a number of consecutive positive samples of the filtered data and a number of consecutive negative samples of the filtered data are within a predetermined limit;
   estimate, in response to the filtered data being validated, an oscillation frequency of the filtered data; and
   estimate a magnitude of the inter-area oscillations between the power systems based on the estimated oscillation frequency.

2. The system of claim 1, wherein the processor is further configured to transmit an alarm based on a comparison between the estimated magnitude and a threshold value.

3. The system of claim 1, wherein the processor is further configured to transmit a trip signal to interrupt power transmission on the one or more power lines based on a comparison between the estimated magnitude and a threshold value.

4. The system of claim 1, wherein the system comprises interface circuitry configured to interrupt power transmission on the one or more power lines based on a comparison between the estimated magnitude and a threshold value.

5. The system of claim 1, wherein the processor is further configured to estimate the oscillation frequency using a time-domain frequency estimation method including:
   (i) determining a raw frequency of an oscillation to be determined,
   (ii) calculating an average frequency of the oscillation, and
   (iii) determining a total number of samples for a full oscillation period.

6. The system of claim 1, further comprising a subsystem configured to:
   receive other data related to measurements of characteristics of electricity passing through the one or more power lines; and
   transmit the other data to the processor.

7. A non-transitory computer readable medium for detecting inter-area oscillations between power systems, the computer-readable medium comprising instructions that, when executed by a processor, cause the processor to perform operations comprising:
   receiving data related to measurements of characteristics of electricity passing through one or more power lines;
   filtering the received data;
   validating the filtered received data by performing a time domain validation check and a dead band frequency check, the time domain validation check including determining whether the filtered data lie in a predetermined frequency band, and the dead band frequency check including determining whether a number of consecutive positive samples of the filtered received data and a number of consecutive negative samples of the filtered data are within a predetermined limit;
   estimating, in response to the filtered data being validated, an oscillation frequency of the filtered data;
   estimating a magnitude of the inter-area oscillations based on the estimated oscillation frequency;
   comparing the estimated magnitude with a threshold value; and
   generating, based on a result of the comparing, a trip signal for interrupting power transmission on the one or more power lines.

8. The non-transitory computer readable medium of claim 7, wherein the operations further comprise generating an alarm signal based on the result.

9. The non-transitory computer readable medium of claim 7, wherein the validating includes determining whether consecutive positive AC samples of the filtered received data exceed a first threshold and whether magnitudes of consecutive negative AC samples of the filtered received data exceed a second threshold.

10. The non-transitory computer readable medium of claim 7, wherein the validating includes determining whether the received data includes a low-magnitude noise signal.

11. The non-transitory computer readable medium of claim 7, wherein the validating includes determining whether other data received during a period previous to a current period have been oscillatory.

12. The non-transitory computer readable medium of claim 7, wherein estimating the oscillation frequency comprises using a time-domain frequency estimation method including:
   estimating a raw frequency of an oscillation to be determined;
   calculating an average frequency of the oscillation; and
   determining a total number of samples for a full oscillation period.

13. A device for detecting inter-area oscillation between power systems, the device comprising:
   interface circuitry configured to receive data related to measurement of characteristics of electricity passing through a first power line;
   filtering circuitry configured to remove a power system frequency component from the data to yield filtered data;
   validating circuitry configured to perform a time domain validation check and a dead band frequency check, the time domain validation check including determining whether the filtered data lie in a predetermined frequency band, and the dead band frequency check including determining whether a number of consecutive positive samples of the filtered data and a number of consecutive negative samples of the filtered data are within a predetermined limit; and
   a processor configured to (i) estimate an oscillation frequency from the filtered data and (ii) estimate a magnitude of the inter-area oscillations based on the estimated oscillation frequency.

14. The device of claim 13, wherein the processor is configured to generate one of an alarm signal and a trip signal based on a comparison between the estimated magnitude and a predetermined threshold value.

15. The device of claim 14, comprising a network interface circuit configured to transmit one of the alarm signal and the trip signal.

16. The device of claim 13, comprising a network interface circuit configured to receive other data related to measurements of characteristics of electricity passing through a second power line.

17. The device of claim 16, wherein the filtering circuitry is configured to remove a power system frequency component from the other data to yield other filtered data, and wherein the processor is configured to estimate another oscillation frequency from the second filtered data using a time-domain frequency estimation method.

18. The system of claim 1, wherein the processor is further configured to remove a power system frequency component from the received data to extract 0.1 Hz to 1.0 Hz frequency signals.

19. The non-transitory computer readable medium of claim 7, wherein the operations further comprise removing a power system frequency component form the received data to extract 0.1 Hz to 1.0 Hz frequency signals.

* * * * *